Figure 7:
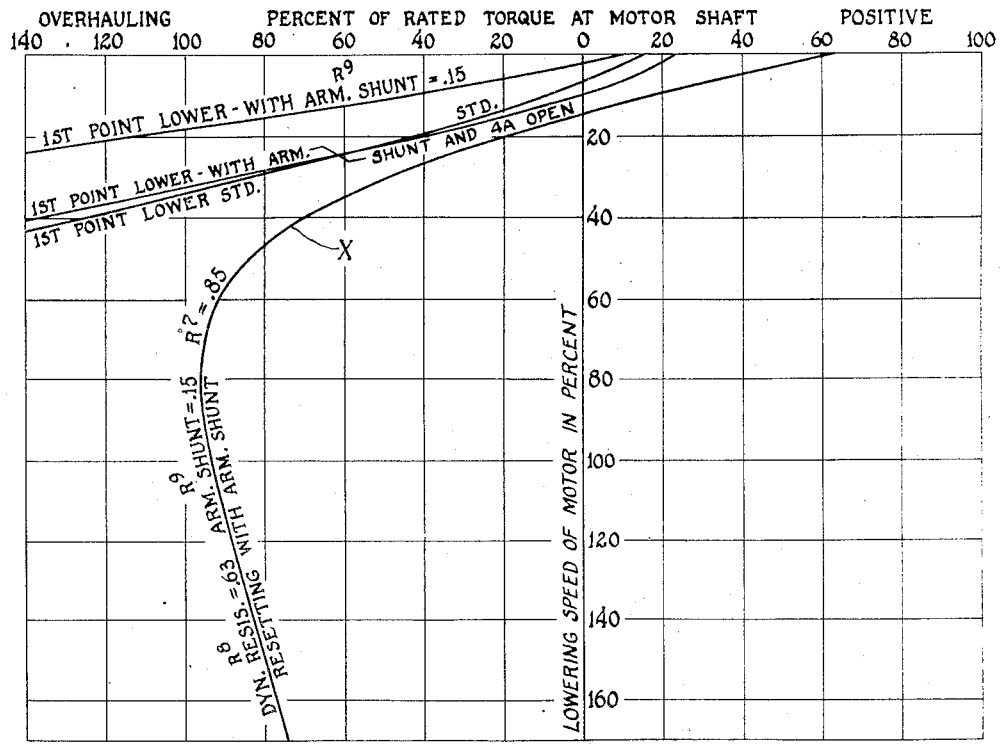

May 27, 1947.  J. M. NEWMAN  2,421,080
MOTOR CONTROL FOR HOISTS
Filed July 20, 1945  3 Sheets-Sheet 1
Fig. 1
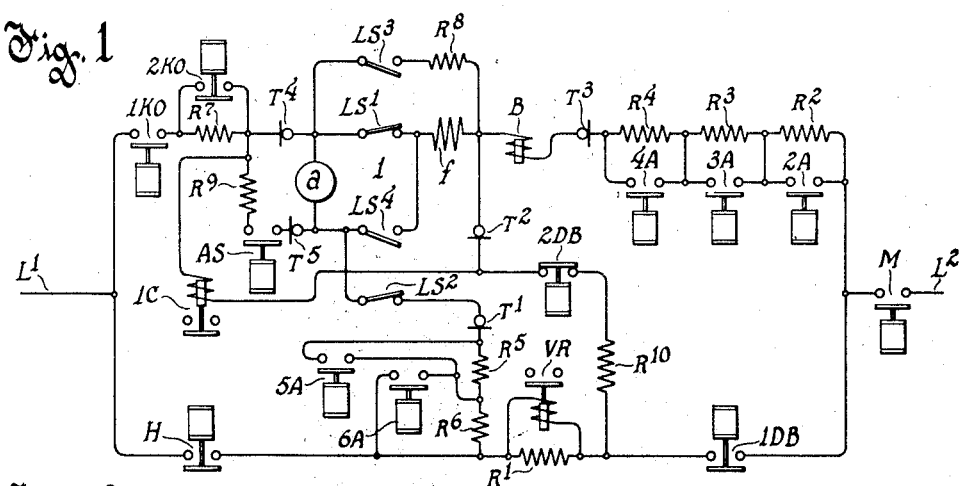
Fig. 2 HOIST— LAST POSITION
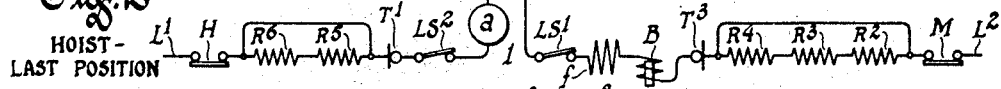
Fig. 3 HOIST— LIMIT
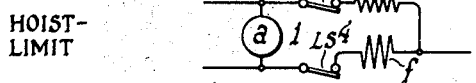
Fig. 4 BACKOUT PRIOR TO RESET
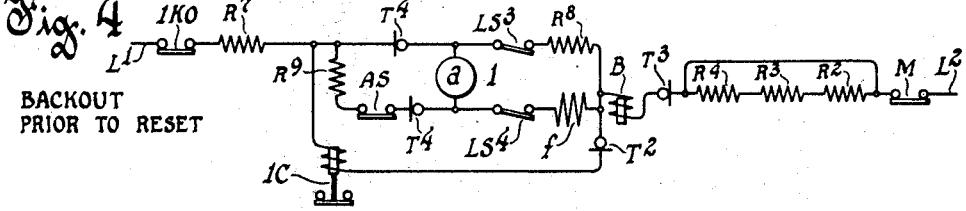
Fig. 5 BACKOUT WITH RESET
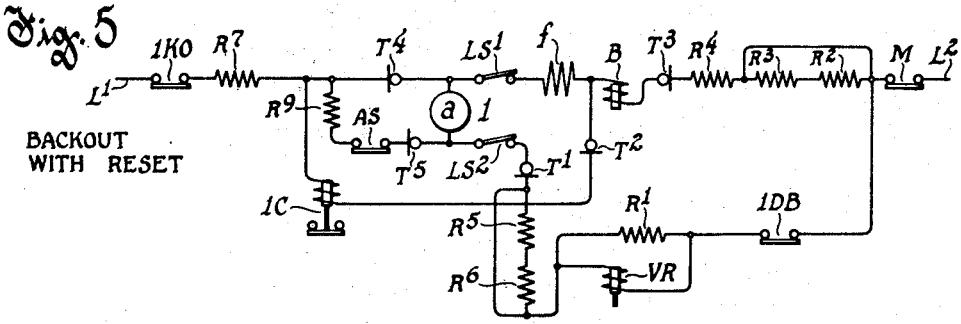
Inventor
John M. Newman
By [signature]
Attorney

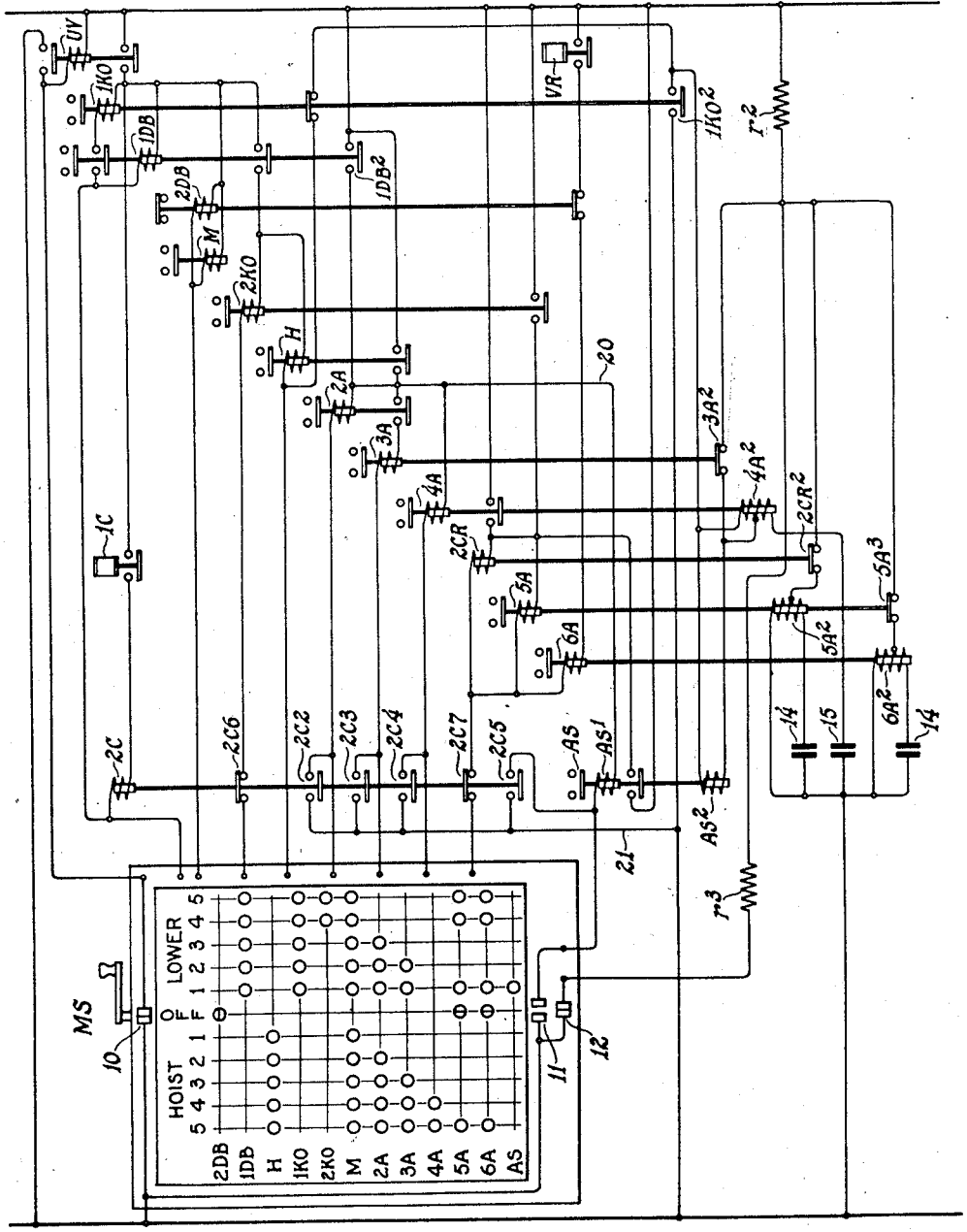

May 27, 1947.  J. M. NEWMAN  2,421,080
MOTOR CONTROL FOR HOISTS
Filed July 20, 1945  3 Sheets-Sheet 3

MOTOR SPEED TORQUE CURVES.
BACKING OUT OF OR RESETTING
SAFETY LIMIT STOP WITH DYNAMIC
LOWERING HOIST CONTROLLER.
RESISTOR VALUES ARE EXPRESSED
IN PERCENT OF $\frac{E}{I}$.

Inventor
John M. Newman
By Frank W. Hubbard
Attorney

UNITED STATES PATENT OFFICE 2,421,080

MOTOR CONTROL FOR HOISTS

John M. Newman, Wauwatosa, Wis., assignor to Cutler-Hammer, Inc., Milwaukee, Wis., a corporation of Delaware Application July 20, 1945, Serial No. 606,198

8 Claims. (Cl. 172—152)

1

This invention relates to control of direct current series motors employed for hoisting and lowering, and is particularly applicable to control of such motors employed in ladle crane service.

Such motors are commonly operated as series motors in hoisting, whereas for lowering, the armature and field winding are connected in parallel for shunt motor characteristics. Also such motors are commonly under the control of a hoist limit device which trips at a given upper limit to terminate power supply and to commutate the motor connections for dynamic braking action, resetting of the limit device requiring reverse or back-out motor operation. A commonly employed type of limit device affords such resetting motor operation by a reversing series connection of the motor armature and field winding, maintaining such connection until the limit device automatically resets and in conjunction with other control means establishes parallel relation of the motor armature and field winding for continued lowering operation subject to dynamic braking action of the motor. Also such limit devices have sometimes been supplemented with means to provide an armature shunt during the resetting operation in order to obtain a less abrupt change in speed as the limit device commutates the armature and field winding connections from series to parallel relation.

On the other hand, systems utilizing limit devices of the aforestated character have lacked provision for guarding against runaway conditions in the event of failure of the limit device to reset upon back-out operation. In other words, reset by a relatively small number of revolutions of the motor has been treated as a certainty, whereas runaway conditions have actually occurred, presumably because of failure of the limit device to reset. In any event it has been ascertained that failure of the limit device to reset would account for the runaway conditions which have been experienced, and it is an object of the present invention to provide control guarding against such runaway conditions upon failure of the limit device to reset.

Another object is to provide the desired protection by use of simple means inclusive of a modification of the armature shunt heretofore proposed to hold down the motor speed throughout the normal resetting range.

Another object is to eliminate the complications resulting from possible establishment of the armature shunt in hoisting direction where

2 the armature shunt has been controlled through the means heretofore employed.

Another object is to avoid need of making any alterations in the mechanical limit device heretofore commonly employed.

Another object is to maintain pending reset of the limit device the protective connections regardless of attempt of the user to speed up the motor.

Various other objects and advantages of the invention will hereinafter appear.

The accompanying drawings illustrate diagrammatically one embodiment of the invention which will now be described, it being understood that the embodiment illustrated is susceptible of various modifications without departing from the scope of the appended claims.

In the drawings,

Figure 1 is a simplified showing of the power connections and control instrumentalities therefor but without control for the latter;

Figs. 2, 3, 4, and 5, are simplified diagrams of motor connections established under different conditions;

Fig. 6 is a line diagram of the control circuits for the instrumentalities shown in Fig. 1 and certain additional instrumentalities, and Fig. 7 is a chart showing speed torque characteristics.

Referring to the drawings, there is shown a motor $1$ having an armature $a$ and a field winding $f$ to be connected in series to lines $L^1$ and $L^2$ for hoisting and in parallel for lowering. The motor is shown as incorporated in a system which in the main is of a well known form representative of many actual installations, wherefore detailed description of much of the system is unnecessary. As in all such systems the motor is provided with an electrically controlled mechanical brake represented in the drawing by a brake coil B.

The heretofore commonly employed control means illustrated includes an electroresponsive main switch M to connect the motor across lines $L^1$ and $L^2$, jointly with an electroresponsive main switch H for hoisting and jointly with electroresponsive switches 1KO and 1DB for lowering. Such control means further includes resistors $R^2$, $R^3$, $R^4$ controllable by electroresponsive switches 2A, 3A and 4A, respectively, resistors $R^5$ and $R^6$ controllable by electroresponsive switches 5A and 6A, respectively, and a resistor $R^7$ controllable by an electroresponsive switch 2KO. Other commonly employed instrumentalities illustrated include an electroresponsive switch 2DB, a relay VR having its winding connected across a resistance $R^1$, and a hoist limit switch comprising normally engaged sets of contacts $LS^1$, $LS^2$ and normally disengaged sets of contacts $LS^3$, $LS^4$. Also resistor $R^5$ in series with the limit switch contacts $LS^3$ and the resistor $R^{10}$ in series with the switch 2DB are usual, as are also trolley connections $T^1$, $T^2$, $T^3$ and $T^4$.

The means thus far described include means employed in the usual manner to provide for maximum speed hoisting. They provide the connections shown in Fig. 2 wherein the resistors $R^2$ to $R^4$, $R^5$ and $R^6$ are short-circuited so that the motor armature and field together with the brake winding B are connected directly across lines $L^1$ and $L^2$ through the normally closed limit switch contacts $LS^1$ and $LS^2$. Here it is to be noted that the left hand terminal of the field winding is connected to the upper terminal of the motor armature.

When the limit switch trips in the usual manner it opens contacts $LS^1$ and $LS^2$ to interrupt power connections, and closes contacts $LS^3$ and $LS^4$ to establish for the motor the dynamic braking connections shown in Fig. 3. Here it will be noted that the relation between the motor field winding and armature is the reverse of that obtaining in Fig. 2, the left hand terminal of the motor field winding now being connected to the lower terminal of the motor armature. Also it will be noted that the dynamic braking circuit includes the resistor $R^8$, and as will be understood the brake coil B will then have been deenergized for setting of the mechanical brake so that quick stopping will be afforded by mechanical braking supplemented by dynamic braking.

Considering now the additional means shown in Fig. 1, the same includes an electroresponsive switch AS to complete a shunt for the motor armature $a$ through a resistor $R^9$, this armature shunt including the aforementioned trolley connection $T^4$ and the single added trolley connection $T^5$. Also the additional control means includes a relay IC having one winding terminal connected to a point between resistors $R^7$ and $R^9$ and having its other winding terminal connected through trolley connection $T^2$ to a point between the motor field winding $f$ and brake coil B. Thus with the limit switch contacts in the positions shown in Fig. 1 the winding of relay IC is connected across the motor field winding $f$. The relay IC is thus rendered responsive upon excitation of the motor, as hereinafter set forth. The switch AS which is of the normally open type is controlled, as will later appear, to close the armature shunt in the first lowering position of a master controller and to maintain said shunt while the master controller remains in such position. Moreover switch AS is controlled to maintain said armature shunt upon movement of the master controller to other lowering positions while the limit device remains tripped. It is not subject to energization in hoisting.

After tripping of the limit switch to stop the motor as aforedescribed, energization of main switch M and switch IKO will connect the motor across lines $L^1$ and $L^2$, as depicted in Fig. 4, for back-out and resetting of the limit switch. Here it will be noted that the motor armature and field winding are in series relation, but with said motor elements in the same reversed relation as in Fig. 3 whereby the motor is caused to operate in lowering direction. Also it will be noted that with the connections of Fig. 4 the motor armature and field winding are shunted through resistor $R^8$ by limit switch contacts $LS^3$ and are also shunted by the winding of relay IC, whereas the motor armature alone is shunted through resistor $R^9$ by the switch AS. Relay IC is thus responsive to the countervoltage of the motor, and upon responding acts through the control hereinafter set forth to effect short-circuiting of the series resistors $R^2$ to $R^6$, whereas resistor $R^7$ is included as a series resistor. These connections afford the aforementioned protection against runaway of the motor should the limit switch fail to reset.

With the connections shown in Fig. 4 it has been found possible to so proportion the various resistors in circuit with the motor as to utilize the armature shunt for dynamic braking effective to restrict the motor to a safe speed under any overhauling conditions likely to be met with and without in anywise interfering with the desired hoisting and lowering control under normal conditions. More particularly it has been found possible by modifying an existing control through provision of the connections of Fig. 4 and proper proportioning of the resistors, to obtain the safe and otherwise highly desirable speed torque curve X depicted in Fig. 7. As depicted by this curve, the motor is afforded not only the characteristic of sufficient torque to restrict the motor to a safe speed under heavy overhauling load but is also afforded the characteristic of ample positive torque to meet requirements.

Here it is desired to point out that the per cent E/I of the armature shunt is very important for the curves become progressively poorer from a safety angle as the percentage is increased, an increase to 70 resulting in reduction of the per cent of rated torque at motor shaft to about 10. Also it is desired to point to the relatively high positive torque values of curve X as compared with those of the curve of Fig. 7 marked "1st Point Lower Std.," the latter depicting the characteristics of a present standard controller without the armature shunt proposed herein and with the limit device in normal position for operation of the motor as a shunt motor in lowering.

If upon back-out provided for by the connections of Fig. 4 the limit switch resets, the motor connections will be commutated to those shown in Fig. 5 pending some further operation of the master controller. Here it is to be noted that the motor armature and field winding are in a parallel relation whereby the motor in accordance with past practice functions as a shunt motor throughout the remainder of the lowering operation. In fact, the connections are the ordinary connections except for maintenance of the armature shunt through resistor $R^9$ and inclusion of series resistor $R^4$ pending movement of the master switch out of first lowering position to deenergize switch AS and otherwise vary the motor connections. However, the maintenance of this armature shunt in nowise impairs the operation and functioning of the system which is now no longer influenced by the relay IC, the latter being deenergized when the connections of Fig. 5 are established, and in turn effecting release of switch 4A to include series resistor $R^4$. The relay IC is deenergized with the connections shown in Fig. 5 because its winding is in parallel with the motor field winding alone and the voltage drop across the motor field winding is insufficient to maintain said relay energized.

Here it is desired to point out that the curve of Fig. 7 marked "With Arm. Shunt and 4A Open" depicts the speed torque characteristics obtained with the connections of Fig. 5 and that this curve closely simulates the curve marked "Std.," whereas its positive torque values are higher. Also it is desired to point out the contrast between the two curves of Fig. 7 depicting the characteristics obtained with and without opening of switch 4A for inclusion of resistor R⁴. It will be noted that unless the switch 4A be opened the characteristics vary widely from those of the standard control and afford but little positive torque.

Referring to Fig. 6, it depicts master switch control of the aforementioned switches and certain others, the master switch MS being assumed to be of the drum type. For simplicity of illustration and to facilitate understanding of the control the showing of the master switch comprises mainly a chart of the positions and functions thereof, the showing of contacts being limited to those for three of the numerous control circuits. The control circuits are in the main well known, and as will be understood each circuit leading from the master switch is to be controlled by a set of contacts similar to one or another of the three sets of contacts 10, 11 and 12 shown. The contacts 10 and 12 are engaged in the off position of the master switch, while contacts 11 are disengaged in off position of the master switch. The latter contacts associated with switch AS are shown by the chart to be engaged in the first lowering position of the master switch and only in such position thereof. The circuits controlled by the contacts 10 and 12 are not included in the chart and it is to be understood that these contacts are to be controlled for disengagement in all positions of the master switch other than off position wherein they are engaged. Contacts 10 control a commonly employed low voltage relay UV which is adapted upon responding to shunt the master switch contacts and thereby to become self-maintaining subject to de-energization upon an abnormal drop in line voltage.

The switches shown in Fig. 6 additional to those shown in Fig. 1 include a relay 2C under the control jointly of the master switch and relay IC shown in both Figs. 1 and 6. Also Fig. 6 shows time element means which comprises restraining windings AS², 4A², 5A² and 6A² for the switches AS, 4A, 5A and 6A, respectively. Predetermined portions of windings 5A² and 6A² are connected across lines L¹ and L² in parallel through a resistor $r^2$ and respectively through normally closed contacts 2CR² and 5A³ of relay 2CR and switch 5A, respectively. Also the windings 5A² and 6A² have in parallel therewith individualized condensers 14. The winding AS² is in parallel with a predetermined portion of winding 4A² and the same are connectable to line L¹ by normally disengaged contacts IKO² of switch IKO, whereas they are connectable to line L² through resistor $r^2$ by normally engaged contacts 3A² of switch 3A. The windings AS² and 4A² also have associated therewith a condenser 15 which is connected in a closed loop therewith when contacts IKO² engage. The contacts 12 of the master switch in off position complete a circuit from line L¹ through a resistor $r^3$ to resistor $r^2$, thus providing in off position of the master switch a resistance shunt for the restraining windings connected to the supply circuit.

Unless the hoist limit is tripped the control illustrated functions in the usual and well known manner clearly indicated by the chart incorporated in the showing of the master switch, it being understood that each switch noted on the chart is closed in all positions of the master switch where a circle has been inserted, whereas each of said switches is open in all other positions of the master switch. The circles with horizontal transverse lines indicate that their respective switches are biased to closed position, as in the case of switch 2DB. The circles with vertical transverse lines indicating conditions of switches 5A and 6A indicate that in off position of the master switch the switches 5A and 6A close subject to control by the voltage relay VR. Thus it will be apparent that in the fifth hoisting position of the master switch the aforedescribed hoisting connections of Fig. 2 will be established, and that in the other hoist positions the motor connections are the same except for the usual resistor commutations.

If the hoist limit be tripped the connections of Fig. 3 will obviously be established even though the master switch remains in hoist position, for such connections are established by the hoist limit contacts per se, whereas the hoist limit contacts per se disconnect the motor and brake winding B from line L¹. Also such connections are obviously preserved when the master switch is returned to off position with the hoist limit tripped.

When after tripping of the hoist limit the master switch is moved to the first lowering position it will be observed from the showing of Fig. 6 that the connections of Fig. 4 are brought about in the following manner. As shown by the chart, switch IDB is thereby energized, but with the limit switch tripped it does not complete any motor circuit and hence is omitted from the showing of Fig. 4. Also as shown by the chart, switches IKO, M and AS are closed in the first lowering position, thus affording the line connections and armature shunt of Fig. 4 which is a simplified showing of certain connections of Fig. 1. Here it will be noted that the contacts 11 of the master switch complete circuit from line L¹ to and through the winding AS¹ of switch AS by conductor 20 to and through the now engaged contacts IDB² of switch IDB to line L², and the switch AS in this position of the master switch is immediately responsive because its restraining winding AS² is not energized.

With power supplied to the motor connections of Fig. 4 relay IC, Fig. 1, responds to the counter voltage of the motor and serves jointly with the master switch to complete the energizing circuit of relay 2C, Fig. 6, through the contacts of the low voltage relay UV. Relay 2C is thus rendered responsive to engage its contacts 2C², 2C³ and 2C⁴ to connect the windings of switches 2A, 3A and 4A, respectively, by conductors 21 and 22 common thereto direct to line L¹ independently of the master switch which in its lowering positions affords no control of switch 4A. As contacts IDB² are now engaged, switch 2A is rendered responsive and in responding renders switch 3A responsive, whereas switch 4A is immediately responsive, and hence said switches short-circuit all resistors R² to R⁴, as indicated in Fig. 4. As shown by the chart, the master switch in the first lowering position continues energization of switches 2A and 3A upon release of relay 2C, but renders initial and continued energization of switch 4A dependent upon energization of relay 2C by relay IC. Further, relay 2C through engagement of its contacts 2C⁵ connects the winding AS¹ direct to line L¹ to provide a maintaining circuit therefor pending release of relay 2C by release of relay IC, or as the result of voltage failure. Also relay 2C in responding disengages contacts 2C⁶ and 2C⁷ to block energization by the master switch of certain switches. More specifically, disengagement of contacts 2C⁶ blocks energization of switch 2KO, whereas disengagement of contacts 2C⁷ blocks energization of relay 2CR and switches 5A and 6A pending release of relay 2C. As shown by the chart, the switch 2KO is not energized in the first lowering position of the master switch, and hence resistor R⁷ is included in the motor circuit, as shown in Fig. 4. As will now be apparent, the connections of Fig. 4 will be maintained pending reset of the limit switch even though the master switch be moved to other lowering positions.

If the hoist limit then be reset while the master switch remains in the first lowering position and while the relay 2C remains energized, the contacts of the hoist limit will effect the changes in motor connections depicted in Fig. 5 and also denergization of relay IC by removing the motor armature from shunting relation to the winding of said relay, and said relay in releasing releases relay 2C, with the following results. Release of relay 2C deenergizes switch 4A to remove the short-circuit around resistor R⁴ and also completes the preset energizing circuits for switches 5A and 6A to short-circuit, as shown in Fig. 5, the resistors R⁵ and R⁶ of the armature branch of the motor circuit. Thereupon movement of the master switch to any other lowering position will deenergize switch AS to interrupt the armature shunt of the motor through resistance R⁹, leaving the motor subject to lowering control by the master switch in the usual and well known manner which is clearly indicated by the chart of Fig. 6.

Since the master switch in its first lowering position provides for energization of switch AS it is desirable to provide means which, following further lowering movement of the master switch, will delay response of switch AS on return movement of the master switch to its first lowering position, to afford the motor time to decelerate. This is provided for by the means described including the restraining winding AS² for the switch AS. This restraining winding is energized upon closure of contacts IKO² and is maintained energized pending response of switch 3A² which upon return movement of the master occurs in the second lowering position. Meanwhile, the condenser 15 has been charged and delays deenergization of the restraining winding AS² until the motor has had an opportunity to slow down as a function of response of switch 3A.

The other portions of the time limit means are commonly employed in hoist controllers and function in a well known manner, wherefore description thereof is deemed unnecessary.

What I claim as new and desire to secure by Letters Patent is:

1. In combination, an electric motor having a series field winding, limit mechanism for disconnecting said motor from its source at a predetermined limit of operation and at the same time establishing a closed loop including the armature of said motor and said field winding in a reversed relation for braking said motor, means for supplying power to said loop for reverse operation of said motor to reset said limit mechanism, means affording an armature shunt for said motor for such reverse operation, and resistances for such reverse motor connections affording the power connections, the loop and the armature shunt E/I values respectively approximating 85, 63 and 15 per cent, thereby to protect said motor against runaway conditions should the limit mechanism fail to reset.

2. In combination, an electric motor having a series field winding, limit mechanism for disconnecting said motor from its source at a predetermined limit of operation and at the same time establishing for the armature of said motor and said field winding a closed loop which reverses the relation thereof for dynamic braking, means for supplying power to said loop for reverse operation of said motor as a series motor to reset said limit mechanism, and to afford for further reverse operation connection of the armature of said motor and said field winding in parallel upon resetting of said limit mechanism, and resistances for such reverse power connections which pending commutation of the motor armature and said field winding from series to parallel relation affords the power connections, said loop and said armature shunt E/I values respectively approximating 85, 63 and 15 per cent.

3. In combination, an electric motor having a series field winding, limit mechanism for disconnecting said motor from its source at a predetermined limit of operation and at the same time establishing for the armature of said motor and said field winding a closed loop which reverses the relation thereof for dynamic braking, means for supplying power to said loop for reverse operation of said motor as a series motor to reset said limit mechanism, and to afford for further reverse operation connection of the armature of said motor and said field winding in parallel upon resetting of said limit mechanism and resistance controlling means affording series resistance, loop resistance and armature shunt resistance of E/I values approximating respectively 85, 63 and 15 per cent, and effecting a predetermined increase in series resistance upon change of the relation of the motor armature and said field winding from series to parallel.

4. In combination, an electric motor having a series field winding, limit mechanism for disconnecting said motor from its source at a predetermined limit of operation and at the same time connecting the armature of said motor and said field winding in a closed loop and in reversed relation for dynamic braking, means comprising a manual element, for supplying power to said closed loop for reverse motor operation for resetting of said limit mechanism, and means under the control of the former means to establish an armature shunt for said motor and to maintain said armature shunt pending both resetting of said limit mechanism and given adjustment of said manual element subsequent to establishment of said armature shunt.

5. In combination, an electric motor having a series field winding, limit mechanism for disconnecting said motor from its source at a predetermined limit of operation and at the same time connecting the armature of said motor and said field winding in a closed loop and in reversed relation for dynamic braking, means comprising a master controller for supplying power to said closed loop for reverse motor operation to reset said limit switch, and means responsive to said master controller when in its first reverse position, to establish an armature shunt for said motor and to maintain said armature shunt pending both resetting of said limit mechanism and movement of said master controller out of its first reverse position.

6. In combination, a motor having a series field winding, limit mechanism for disconnecting said motor from its source at a predetermined limit of operation and establishing a closed loop including the armature of said motor and said field winding in a reversed relation for dynamic braking, means including a manual element, for supplying power to said loop for reverse operation of said motor as a series motor to reset said limit mechanism, said means upon resetting of said limit mechanism affording power connections for continued reverse operation of said motor but with its armature and said field winding in parallel relation, means under the control of said manual element to provide an armature shunt for said motor upon supply of power to said loop and to maintain said armature shunt pending reset of said limit mechanism and a change in position of said control element and resistance controlling means for said reverse power connections affording a given resistance change as the armature and field winding of said motor are changed from series to parallel relation.

7. In combination, a motor having a series field winding, limit mechanism for disconnecting said motor from its source at a predetermined limit of operation and establishing a closed loop including the armature of said motor and said field winding in a reversed relation for dynamic braking, means including a manual element, for supplying power to said loop for reverse operation of said motor as a series motor to reset said limit mechanism, said means upon resetting of said limit mechanism affording power connections for continued reverse operation of said motor but with its armature and said field winding in parallel relation, means controlled by said manual element to provide an armature shunt for said motor upon supply of power to said loop and to maintain said armature shunt pending both resetting of said limit mechanism and a change in position of said control element, resistances for said reverse power connections and control means for certain of said resistances responsive to an electrical condition of said motor, to effect a given resistance commutation for the aforementioned reverse operation of said motor as a series motor and further responsive to resetting of said limit mechanism, to effect a given resistance commutation for operation of said motor with its armature and field winding in parallel and with said armature shunt established.

8. In combination, a motor having a series field winding, limit mechanism for disconnecting said motor from its source at a predetermined limit of operation and establishing a closed loop including the armature of said motor and said field winding in a reversed relation for dynamic braking, means including a manual element, for supplying power to said loop for reverse operation of said motor as a series motor to reset said limit mechanism, said means upon resetting of said limit mechanism affording power connections for continued reverse operation of said motor but with its armature and said field winding in parallel relation, means controlled by said manual element to provide an armature shunt for said motor upon supply of power to said loop and to maintain said armature shunt pending both resetting of said limit mechanism and a change in position of said control element, resistances for said reverse power connections and control means for certain of said resistances responsive to an electrical condition of said motor, to effect a given resistance commutation for the aforementioned reverse operation of said motor as a series motor and further responsive to resetting of said limit mechanism to effect a given resistance commutation for operation of said motor with its armature and field winding in parallel and with said armature shunt established, said resistances throughout reverse operation of said motor as a series motor affording the power connections, said loop and said armature shunt E/I values respectively approximating 85, 63 and 15 per cent.

JOHN M. NEWMAN.